United States Patent [19]

Honrado

[11] 4,365,540

[45] Dec. 28, 1982

[54] UNDERDASH AIR SWEEP SYSTEM FOR AUTOMOBILES

[75] Inventor: Juanito Honrado, Oxon Hill, Md.

[73] Assignee: Bowles Fluidics Corporation, Silver Spring, Md.

[21] Appl. No.: 194,743

[22] Filed: Oct. 7, 1980

[51] Int. Cl.³ .............................................. B60H 1/14
[52] U.S. Cl. ........................................ 98/2; 98/2.08; 98/40 E; 98/40 N; 239/102
[58] Field of Search .................. 98/2, 2.01, 2.05, 2.08, 98/2.11, 40 E, 40 N, 40 V, 40 VM, 41 R; 137/829, 830, 624.14; 239/101, 102, 284 R

[56] References Cited

U.S. PATENT DOCUMENTS

| | | | |
|---|---|---|---|
| 3,724,357 | 4/1973 | Kavthekar et al. | 98/2.05 X |
| 4,022,599 | 5/1977 | Wilson et al. | 98/2.11 X |
| 4,250,799 | 2/1981 | Stouffer | 98/40 H X |

FOREIGN PATENT DOCUMENTS

| | | | |
|---|---|---|---|
| 54-68034 | 5/1979 | Japan | 98/40 E |
| 54-110535 | 8/1979 | Japan | 98/2.08 |

*Primary Examiner*—Albert J. Makay
*Assistant Examiner*—Harold Joyce
*Attorney, Agent, or Firm*—Jim Zegeer

[57] ABSTRACT

An underdash automobile air flow system having an oscillatory member which is rendered oscillatory solely by air flow, has the oscillations sustained, when the outlet is at least partially blocked, by a pair of laterally positioned underdash apertures or vents.

6 Claims, 2 Drawing Figures

UNDERDASH AIR SWEEP SYSTEM FOR AUTOMOBILES

REFERENCE TO RELATED APPLICATIONS

This invention is an improvement over Stouffer application Ser. No. 030,794 filed Apr. 17, 1979, now U.S. Pat. No. 4,250,799; Stouffer application Ser. No. 119,699 filed Feb. 8, 1980; and Stouffer International application No. PCT/US80/00368 filed Apr. 9, 1980, all assigned to the assignee hereof, and incorporated herein by reference.

BACKGROUND AND BRIEF DESCRIPTION OF THE INVENTION

The invention is directed to the air flow systems in automobiles and in particular to the treated air flow systems in automobiles especially, air conditioning and heating systems, and it may also be used in connection with the defrost/defog system.

In automobile systems, the defrost, air conditioning systems as well as the heating system typically are all contained under the dashboard and prior art efforts to use standard type fluidic nozzles while, basically, functionally good in sweeping a jet of air, the physical size of the fluidic element is much too large to fit within the dash, particularly in small and downsized automobiles. Various electrically powered oscillatory elements have been suggested, however they add cost, complexity and maintenance problems and are not silent. The above referenced Stouffer patent applications discloses a significant improvement in under dashboard automobile air flow systems wherein a source of air under pressure is forced through a channel to an outlet element in a sweeping air stream pattern. An air powered oscillatory member is mounted proximate the center of the outlet element and is proportioned with respect to the cross-sectional size of said outlet element such that at any extreme of its oscillatory movement in said outlet element it does not physically contact any structural portion of said channel and said outlet element. The oscillatory member is rendered oscillatory solely upon the flow of air from said source through said outlet and causing the air flow to sweep back and forth in said outlet element. The oscillatory member including a spring, and means securing the spring at the downstream end to at least one surface of said outlet element.

The present invention is an improvement over the underdash air sweep system of the above-identified Stouffer patents in that the system will maintain oscillation even when one half or more of the outlet is blocked, as when, for example, one passenger does not wish to have the cooled air from the air conditioning unit impinged directly upon the passenger and controls the front louvers or slats to block air flow therefrom. In such case the air may stabilize the oscillatory member on one side to prevent and block or impede the sweeping air flow to the opposite passenger side.

According to the present invention a chamber or space is provided on the downstream end of the sweeping air stream just in advance of the control louvers. The chamber or space is longer than the outlet of the oscillation mechanism. The chamber is generally rectangular and has as one side, the control louvers, top and bottom walls a pair of lateral end walls which have large apertures or openings therein. The side opposite the louvers is open and receives the sweeping air stream and a pair of short straight wall sections connecting the apertures lateral end walls to the diverging side walls of this outlet element. The apertures in the lateral end panels pass a relatively small amount of air when both louver sides are fully open and passes substantially more air during each sweep of the air stream as the juxtaposed side is blocked by the louvers. While the invention is especially intended for the air conditioning and heating outlets, it can be applied to the defrost/defog outlets if desired with the same advantages (for example objects carried on the dashboard can partially block the defrost/defog outlet).

BRIEF DESCRIPTION OF THE DRAWINGS

The above and other objectives, advantages and features of the invention will become more apparent from the following specification when considered in conjunction with the accompanying drawings wherein.

DETAILED DESCRIPTION OF THE INVENTION

The invention will be described with particular reference to an underdash automobile air flow system, particularly the air conditioning system.

Figure 1:
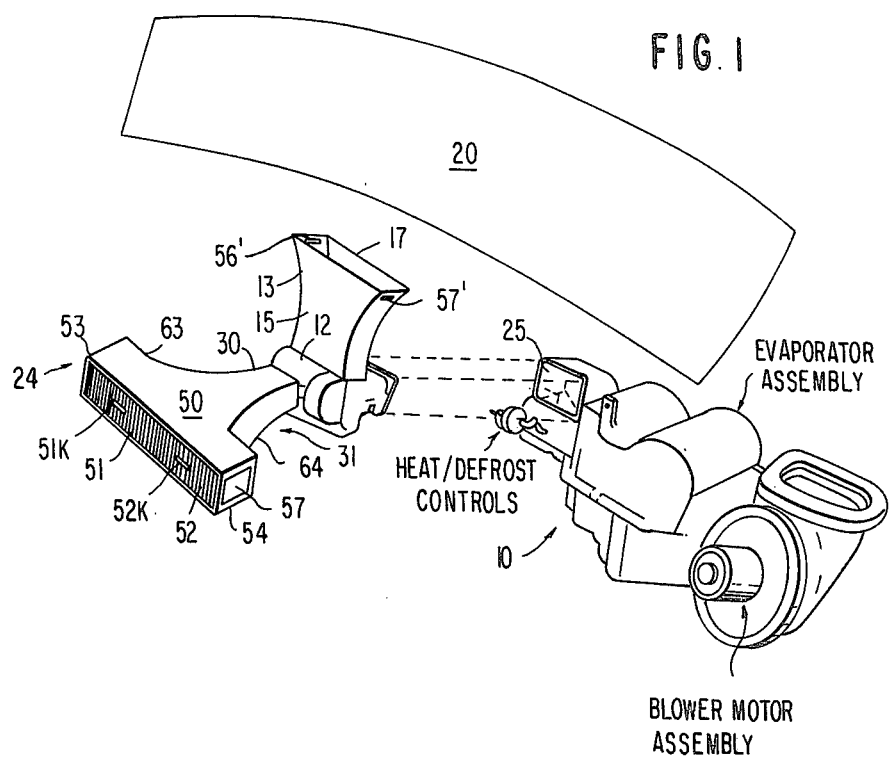
FIG. 1 is an isometric perspective view of an automobile air conditioning system and the windshield defrost-/defog system of an automobile to which the invention has been applied and FIG. 2 is a partial isometric view of an outlet element of the present invention and the chamber or space fed by the sweeping air stream and in advance of the louvers (shown in FIG. 1).

As shown in the embodiment illustrated in FIG. 1, the under dash air flow system according to the invention includes a conventional heater 10 which is usually installed underneath the dashboard or instrument panel 11 connected, via main duct work 12, to defrost/defog nozzle 13. The defrost/defog nozzle 13 is connected via an outlet duct 15 to main duct work 12 but it will be appreciated that separate passage ways or ducting may be utilized for connecting outlet nozzles to car heater 10 in the event two nozzles are used. Nozzle 13 has an outlet opening 17, juxtaposed so as to direct defrost air over the inner surface of windshield 20.

Air for heating the interior of the passenger compartment may be delivered through a separate nozzle (not shown) for directing air from common duct 12 to the interior compartment of the vehicle. It will be appreciated that control linkages and/or cables for controlling valving the duct 12 for directing all the air to outlet nozzle 13 for defrost purposes, and/or to an outlet nozzle for heating the interior compartment of the vehicle are standard control instrumentalities and hence do not per se form a part of the present invention. By the same token, in some automobiles the outlet air nozzles can be connected to a source of outside air if desired.

Still referring to FIG. 1, there is shown air conditioning outlet nozzle 24 which is connected to a conventional automobile air conditioning unit and air circulation system 25. The heat/defrost door or valve assembly and motor, the air conditioner evaporator case and assembly as well as the blower motor and an intake are conventional and not illustrated in detail. The invention will be described in relation to the air conditioning system of FIG. 1 and FIG. 2.

Figure 2:
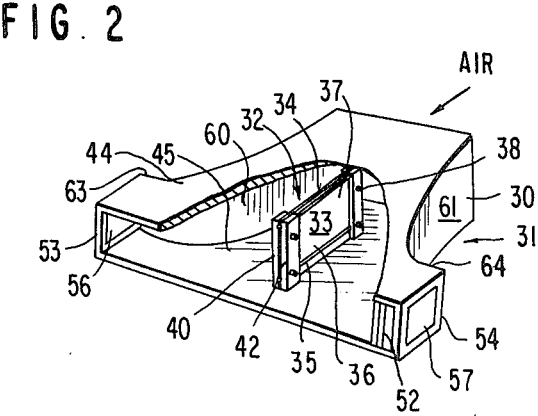

Referring to FIG. 2, the duct or channel 30 of an automobile air conditioning system is indicated as supplying air to a nozzle 24 which incorporates a one form of oscillating vane 32 constituted by the coil spring-elastomeric vane assembly 33, the details of which are disclosed in the aformentioned Stouffer PCT application. In this oscillating element, a pair of spaced coil springs (not shown) are embedded in tubular end sections 34 and 35 of a thin sheet 36, of elastic or elastomeric material, such as rubber. The upstream end 37 of elastic vane 33 has a weight element 38 secured thereto and the coil springs. The downstream end 40 of elastic vane 33 is secured between a pair of mounting bars 41-42 which are used to secure the downstream 40 of the vane assembly to the spaced walls 44-45 of nozzle 31. Other forms of air powered oscillatory elements may be utilized to practice the invention.

It will be appreciated that all rubber or elastomeric material vane-springs may be molded or otherwise formed to have the desired spring-mass characteristics described in the aforementioned Stouffer applications and perform in air flow systems as described above. Likewise, a composite metal-elastometer and spring properties may easily be utilized to practice the invention. The mass or weight required to achieve a desired spring-mass system can be molded into the end of the vane, and the mounting assembly can also be integrally molded into the unit.

THE PRESENT INVENTION

As shown in FIG. 1 and FIG. 2 a chamber or enclosed space 50 is provided to receive the sweeping air stream from outlet element 31. Chamber or space 50 has a set of left and right louvers 51 and 52 on one side thereof, which are conventional and manually controlled by knobs 51k and 52k which are manipulated by the passengers to direct the sweeping air stream to specific areas and/or block the flow of air to their side of the passenger compartment. The top and bottom walls 44 and 45, respectively, are extended to form the top and bottom walls of the chamber (it being understood that the terms "top" and "bottom" are with reference to the drawing and are not intended to be limiting). The left and right lateral ends 53 and 54 are provided with relatively large apertures or openings 56 and 57, respectively, so that when the left or right louvers 51 or 52 block or partially block the sweeping flow of air to the passenger compartment, the air to the impeded side can flow through the aperture and to under the dash. Of course, if desired, the by-passed air can be directed to the rear passenger area of the vehicle.

The left and right diverging sidewalls 60-61, respectively, of the outlet element 31, terminate in a pair of lateral extensions 63,64 from relatively short passages to apertures 56 and 57 respectively.

Chamber or space 50 is downstream of the oscillating element and a rhythmic sound is created as the air powered element moves transversely to the direction of air flow and the alternate blocking and unblocking of air flow through one half of the outlet element. When the louver elements are used to block air flow to one side of the passenger compartment oscillation continues since the air continues to flow through the blocked side's lateral aperture and the rhythmic sound is not changed in a manner that would be distracting to the passengers. In the case of a defrost/defog nozzle, when an object partially blocks air flow to a windshield oscillatory sweep of air to the unblocked side is substantially normal, flowing through apertures 56' and or 57'.

While I have shown and described preferred embodiments of my invention, it will be appreciated that various modifications and adaptations of my invention are possible and it is intended that such modifications and changes as would be obvious to those skilled in the art be encompassed within the spirit and scope of the claims appended hereto.

I claim:

1. In an underdash automobile air flow system wherein a source of air under pressure is forced through a channel to an outlet element in a sweeping air stream pattern, including an air powered oscillatory member, means supporting said oscillatory member proximate the center of said outlet element, said oscillatory member being proportioned with respect to the cross-sectional size of said outlet element such that at any extreme of its oscillatory movement in said outlet element it does not physically contact any structural portion of said channel and said outlet element, said oscillatory member being rendered oscillatory solely upon the flow of air from said source through said outlet and causing the air flow to sweep back and forth in said outlet element, said oscillatory member including a spring, and means securing said spring at the downstream end to at least one surface of said outlet element, the improvement comprising, a chamber between said outlet element and the passenger space of said automobile, said chamber having one side directly coupled to said outlet element and an opposite side coupled to the passenger space of said automobile, and a pair of lateral ends, and means forming apertures in said lateral ends bypassing air to under the dash of said automobile when the side coupled to said passenger space is partially blocked.

2. The invention defined in claim 1 wherein said outlet element has diverging walls and wherein said chamber has walls laterally extending said chamber beyond the diverging ends of said outlet element.

3. The invention defined in claim 1 wherein said air flow system is coupled to an air conditioning unit in said automobile and said opposite side of said chamber includes manually adjustable louvers which can be adjusted to at least partially block air flow into the passenger compartment.

4. In a oscillating member air sweep system in which a flowing air stream is directed upon an oscillator element located in an outlet element, said oscillator element having a free upstream end and a fixed downstream end to cause oscillatory movement of the free upstream end in the flowing air stream, said outlet element having diverging side walls defining the extreme limits between which the air is swept by said oscillator element, the improvement comprising said outlet element having an output element coupled to the downstream end of said diverging side walls, said output element having means for providing an alternative flow path for blocked air flow when air flow through said output element is partially blocked for sustaining oscillation of said oscillation element, said means for providing an alternative flow path including at least one aperture forming means in said output element which is downstream of said oscillator element.

5. The invention defined in claim 4 wherein said air sweep system is mounted under the dashboard of an automobile and said aperture forming means passes air to under the dashboard of said automobile.

6. The invention defined in claim 5 wherein said aperture forming means is in said diverging sidewalls.

* * * * *